United States Patent
Lopez et al.

[11] Patent Number: 5,884,947
[45] Date of Patent: Mar. 23, 1999

[54] CONTROL DOOR SINGLE LATCHING AND LOCATING MECHANISM

[75] Inventors: Michael Andrew Lopez, San Diego; Anthony John Gangitano, Escondido, both of Calif.

[73] Assignees: Sony Corporation, Tokyo, Japan; Sony Electronics, Inc., Park Ridge, N.J.

[21] Appl. No.: 789,598

[22] Filed: Jan. 24, 1997

Related U.S. Application Data

[63] Continuation of Ser. No. 394,410, Feb. 24, 1995, abandoned.

[51] Int. Cl.⁶ ............................................ E05C 3/06
[52] U.S. Cl. .......................... 292/198; 292/209; 292/252
[58] Field of Search ......................... 292/197, 198, 292/204, 209, 252, 84, 87, 89, 235, 240, DIG. 16, 38, 300, 303, 128, 228, 202, 147, DIG. 50; 49/394; 24/662; 312/222

[56] References Cited

U.S. PATENT DOCUMENTS

| | | | |
|---|---|---|---|
| 345,523 | 7/1886 | McGill | 292/DIG. 50 |
| 351,644 | 10/1886 | McGill | 292/DIG. 50 |
| 886,855 | 5/1908 | Prahar | 292/87 |
| 1,045,891 | 12/1912 | Robertson | 292/252 |
| 2,109,759 | 3/1938 | Tachband | 292/204 |
| 2,352,437 | 6/1944 | Howard | 292/87 |
| 3,045,663 | 7/1962 | McDonald | . |
| 3,287,043 | 11/1966 | Delhase | 292/147 |
| 3,650,584 | 3/1972 | Goetz | 312/7 TV |
| 3,744,864 | 7/1973 | Schmitz | 312/244 |
| 4,017,129 | 4/1977 | Boldt | 312/7 TV |
| 4,478,005 | 10/1984 | Mundshenk | 292/87 |
| 4,709,949 | 12/1987 | Umezawa | 292/198 |
| 4,896,624 | 1/1990 | Carnwath | 292/204 |
| 5,243,771 | 9/1993 | Kretchman | 49/394 |
| 5,364,046 | 11/1994 | Dobbs | 292/252 |

Primary Examiner—Steven N. Meyers
Assistant Examiner—Gary Estremsky
Attorney, Agent, or Firm—Blakely, Sokoloff, Taylor & Zafman

[57] ABSTRACT

A control panel door that is pivotally connected to the beznet of a television receiver. The beznet has a pair of radial protrusions which cooperate with a single radial protrusion of the door to secure the control panel door in a closed position. The door is provided with enough lateral movement to allow the single door protrusion to slide past the beznet protrusions when the door is rotated to an open position. The door protrusion and the beznet protrusions also align the control panel door with the beznet when the door is rotated into the closed position.

24 Claims, 3 Drawing Sheets

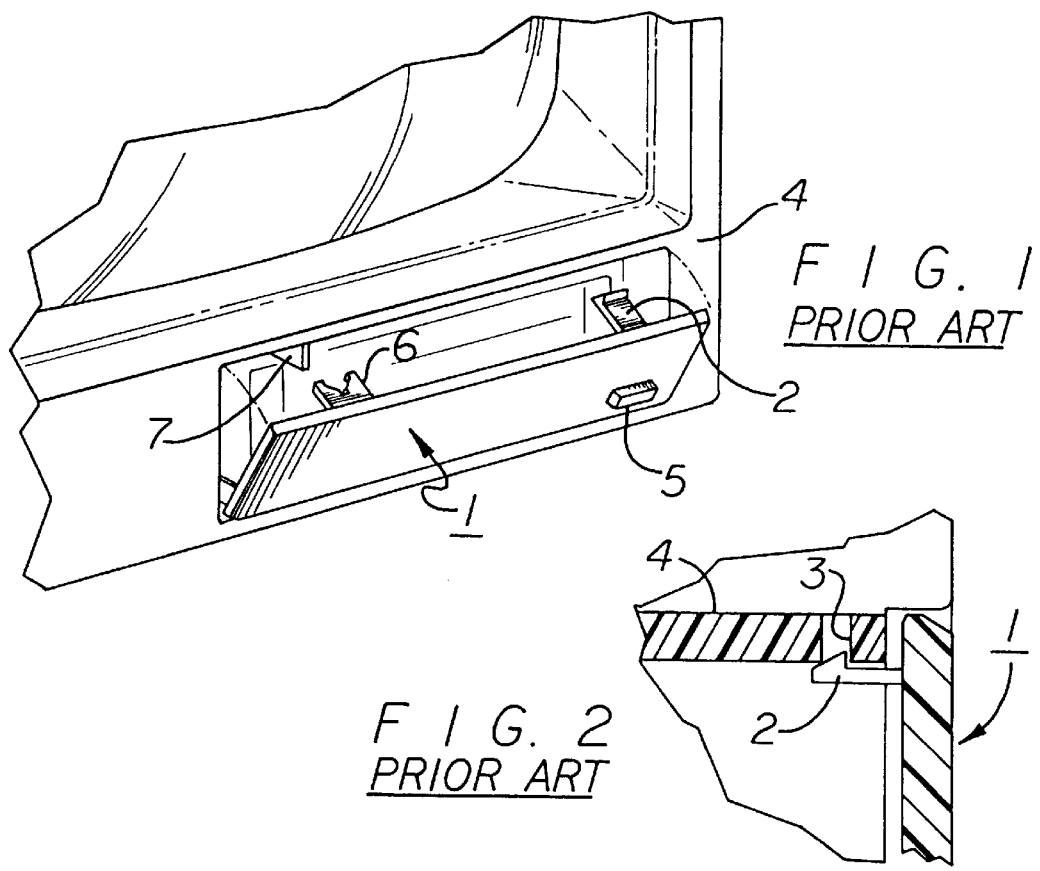
FIG. 1 PRIOR ART
FIG. 2 PRIOR ART
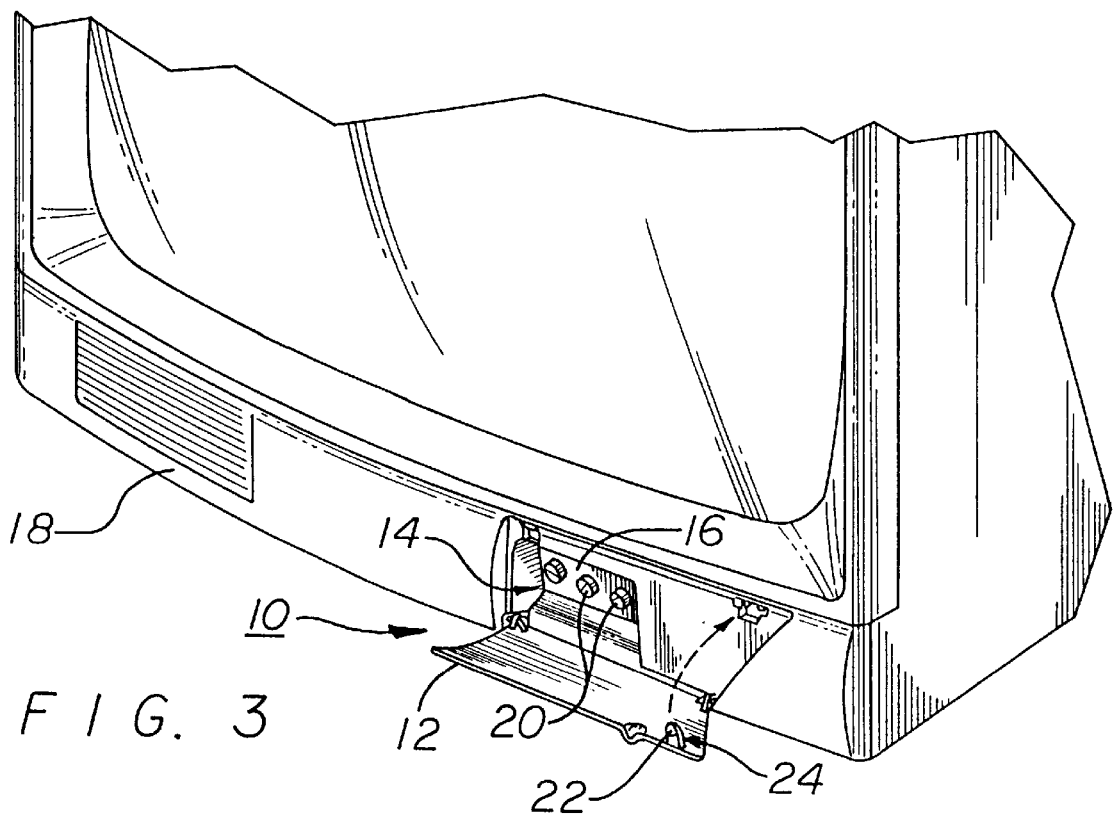
FIG. 3

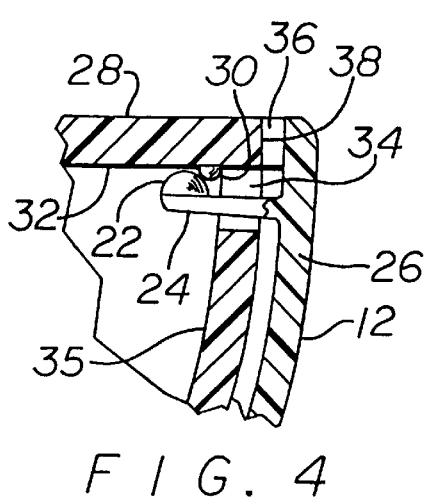
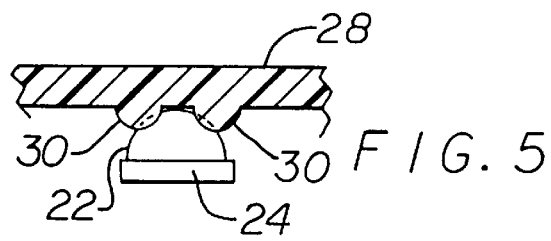
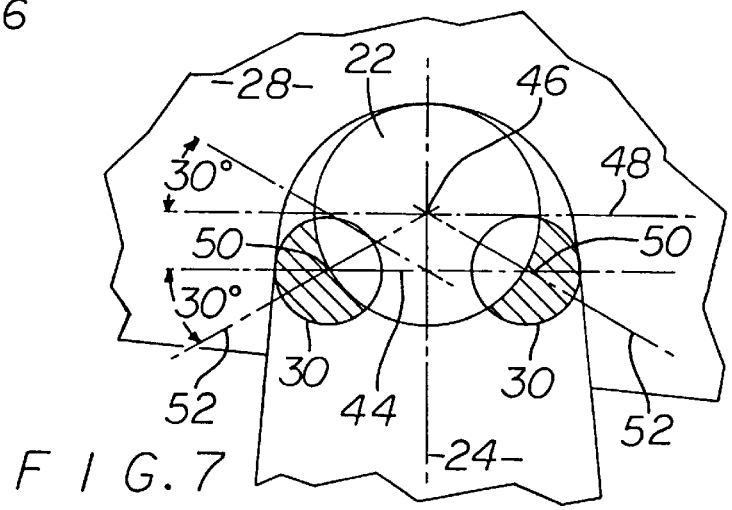
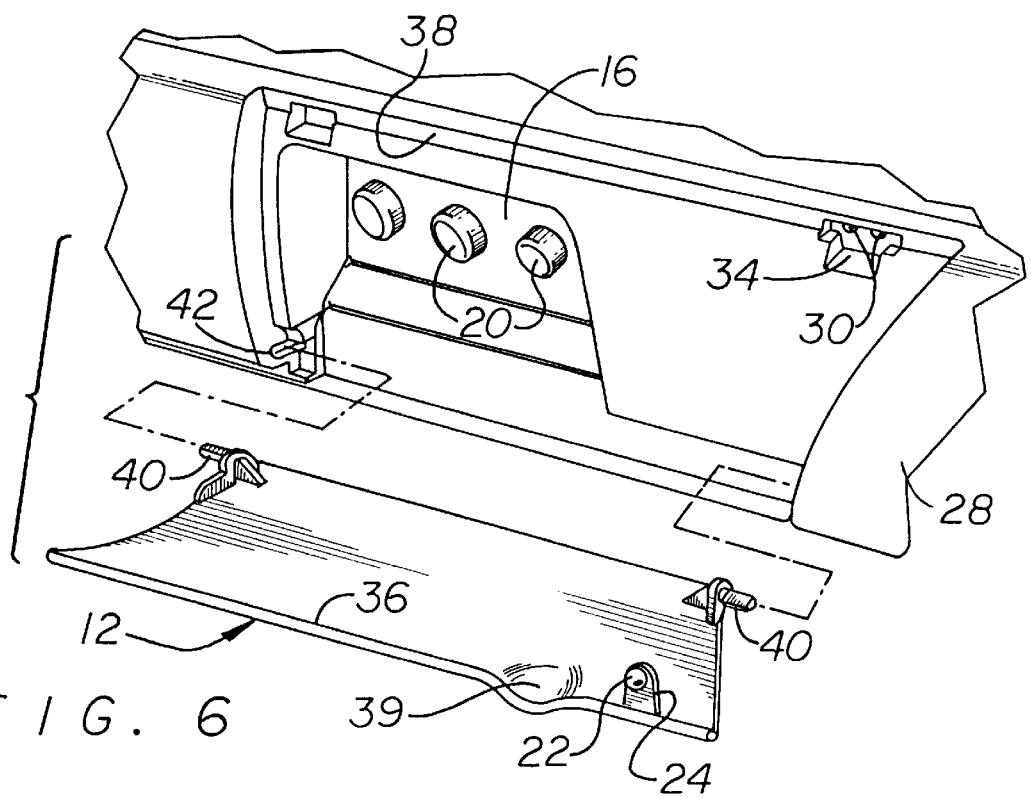

CONTROL DOOR SINGLE LATCHING AND LOCATING MECHANISM

This is a Continuation Application of application Ser. No. 08/394,410, filed Feb. 24, 1995, now abandoned.

BACKGROUND OF THE INVENTION

1. Field of the Invention

The present invention relates to a latch for the door of a television receiver control panel.

2. Description of Related Art

Television receivers have a plurality of control devices, such as buttons or switches, that operate the TV. The control devices are sometimes concealed by a door that is pivotally attached to the housing of the receiver.

FIGS. 1 and 2 show a control panel door 1 of the prior art. The control panel door 1 has a latch 2 which is captured by a slot 3 in the beznet 4 of the receiver. The door 1 may have a button 5 that can be depressed to disengage the latch 2 and open the door 1. The control panel door 1 may also have a locator 6 which cooperates with a rib 7 in the beznet 4 to align the latch 2 with the slot 3 when the door is closed. It has been found that a relatively significant force is required to disengage the latch 2 from the slot 3, thereby increasing the difficulty in operating the receiver. Additionally, the locator 6 and corresponding rib 7 increase the cost in producing the door assembly. It would therefore be desirable to provide a control panel door that required a relatively low opening force and which was less expensive to produce than doors in the prior art.

SUMMARY OF THE INVENTION

The present invention is a control panel door that is pivotally connected to the beznet of a television receiver. The beznet has a pair of radial protrusions which cooperate with a single radial protrusion of the door to secure the control panel door in a closed position. The door is provided with enough lateral movement to allow the single door protrusion to slide past the beznet protrusions when the door is rotated to an open position. The door protrusion and the beznet protrusions also align the control panel door with the beznet when the door is rotated into the closed position.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a perspective view of a control panel door of the prior art;

FIG. 2 is a cross-sectional view of the control panel door of the prior art;

FIG. 3 is a perspective view of a door assembly of the present invention;

FIG. 4 is a cross-sectional view showing a latching mechanism of the door assembly;

FIG. 5 is a front sectional view of the latching mechanism;

FIG. 6 is an exploded view showing a pair of pins which pivotally connect the door to the beznet;

FIG. 7 is an enlarged top sectional view of the latching mechanism;

DETAILED DESCRIPTION OF THE INVENTION

Figure 8:
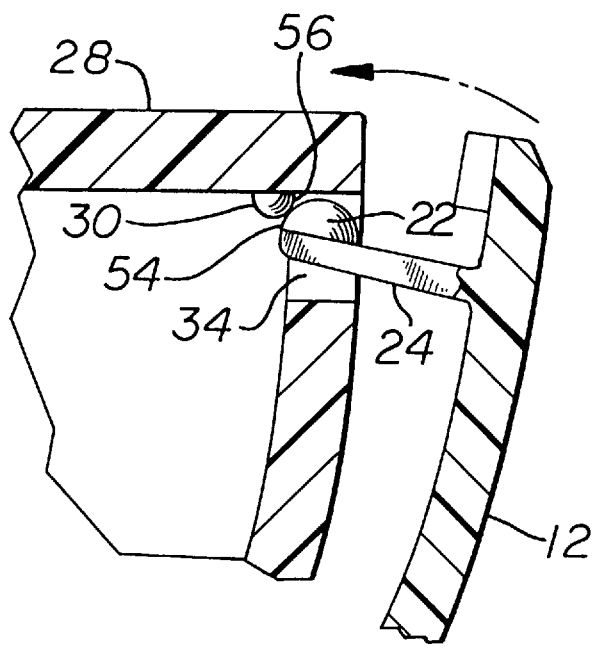
FIG. 8 is a cross-sectional view of the door being closed and the latching mechanism being engaged.

Referring to the drawings more particularly by reference numbers, FIG. 3 shows a control panel door assembly 10 of the present invention. The assembly 10 includes a door 12 that encloses a compartment 14 when in a closed position and exposes the compartment 14 when in an open position. In the preferred embodiment, the door 12 conceals a control panel 16 for a television receiver 18. The control panel 16 typically contains a plurality of buttons 20 or switches that control defined operations of the receiver. Although a television receiver is described and shown, it is to be understood that the door assembly 10 can be used in other electronic devices such as a video cassette recorder (VCR) or an audio system.

As shown in FIGS. 4 and 5, the door 12 has a radial protrusion 22 located at the end of a lip 24. The lip 24 extends from a door panel 26. The receiver beznet 28 has a pair of radial protrusions 30 that extend from an upper surface 32. The outer shell of a television which contains a control panel is commonly referred to as a beznet. The radial protrusion 22 of the lip 24 cooperates with the radial beznet protrusions 30 to maintain the door 12 in the closed position. The beznet protrusions 30 may be located within a slot 34 in a rear beznet wall 35. The door panel 26 may have an upper rib 36 which engages a front beznet surface 38 to limit the travel of the door 12. Additionally, the door panel 26 may have a groove 39 that allows a finger to be inserted between the beznet 28 and the door 12.

As shown in FIG. 6, the door 12 may be pivotally connected to the receiver beznet 28 by a pair of pins 40 that extend into slots 42 formed in the beznet 28. The slots 42 preferably have a diameter that is greater than the diameter of the pins 40, so that the door 12 can be moved in a lateral direction relative to the beznet 28. The lateral door movement allows the door protrusion 22 to be moved past the beznet protrusions 30. The door panel 26, rib 36, protrusion 22 and pins 40 may be formed as a single integrally molded plastic part to provide a relatively inexpensive door. Likewise, the protrusions 30 and slots 42 may be integrally molded into the beznet 28.

As shown in FIG. 7, the radial beznet protrusions 30 are typically separated by a space 44. The space 44 is preferably smaller than the diameter of the door protrusion 22. In the preferred embodiment, the protrusions are configured so that when engaged, the center 46 of the door protrusion 22 is in-line 48 with the outer radius of the beznet protrusions 30. The centers 50 of the beznet protrusions 30 are spaced from the door protrusion center 46 a distance that is equal to the radius of the protrusion 22. The lines 52 that intersect the centers of both the door protrusion 22 and the beznet protrusions 30 are oriented at a 30° angle relative to line 48. The protrusion configuration shown and described has been found to provide a latching mechanism that requires a relatively low actuating force to both engage and disengage the door.

Figure 9:
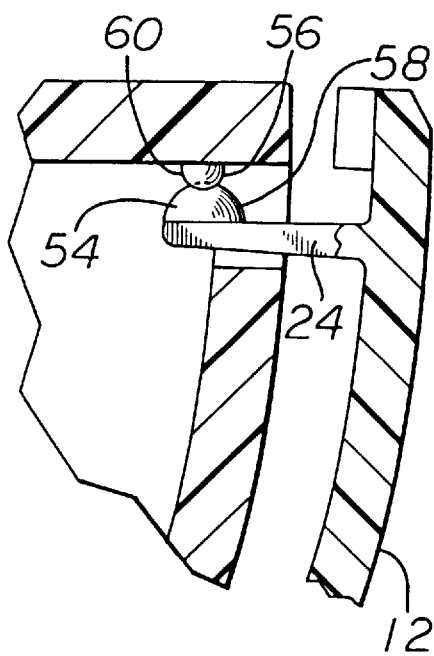
FIG. 9 is a cross-sectional view showing the door protrusion moving past the beznet protrusions.
Figure 10:
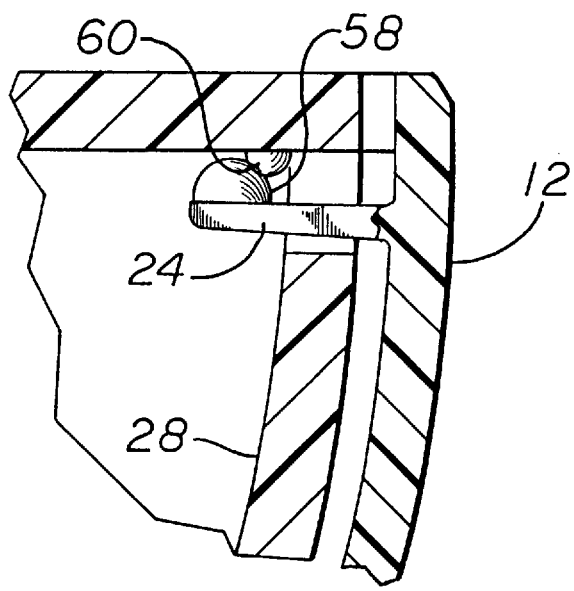
FIG. 10 is a cross-sectional view showing the latching mechanism fully engaged.

FIGS. 8–10 show the door 12 being moved into the closed position. The door 12 is rotated until a front surface 54 of the door protrusion 22 engages a front surface 56 of the beznet protrusions 30. The engagement of the beznet protrusions 30 with the door protrusion 22 aligns the door 12 with the beznet 28. The protrusions therefore provide both a latching mechanism and an alignment feature for the door 12.

Further movement of the door 12 will cause the door protrusion 22 to slide past the beznet protrusions 30. The slots 42 allow the door 12 to move in a lateral downward direction to allow the door protrusion 22 to move past the beznet protrusions 30. When the door 12 is fully closed, the rear surface 58 of the door protrusion 22 engages the rear surface 60 of the beznet protrusions 30 to maintain the door 12 in the closed position.

Figure 11:
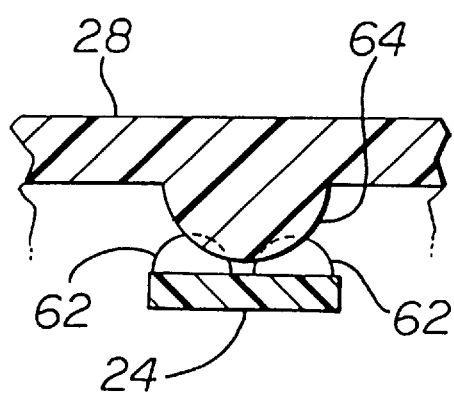
FIG. 11 is a front sectional view showing a latching mechanism wherein the door has a pair of protrusions and the beznet has a single protrusion.

Although a door assembly 10 is shown having a single door protrusion and a pair of beznet protrusions, as shown in FIG. 11, the assembly may be configured so that the door has a pair of protrusions 62 and the beznet 28 has a single protrusion 64.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An electronic device, comprising:
   a housing that has a pair of beznet protrusions that are shaped as a segment of a sphere, wherein each sphere has a center, a forward surface and an opposite rearward surface; and,
   a door pivotally connected to said housing, said door having a door protrusion that is shaped as a segment of a sphere which has a radius, said door protrusion also having a center, a forward surface, and an opposite rearward surface that engages said rearward surfaces of said beznet protrusions to secure said door in a closed position, wherein said center of said door protrusion is spaced from said center of one of said beznet protrusions a distance approximately equal to said radius of said door protrusion when said door is in the closed position.

2. The electronic device as recited in claim 1, wherein said door protrusion is integral with a lip that extends from a door panel of said door.

3. The electronic device as recited in claim 1, wherein said door protrusion has a diameter that is greater than a predetermined distance which separates said beznet protrusions.

4. The electronic device as recited in claim 1, wherein said door has a rib that engages said housing when said door is in the closed position.

5. The electronic device as recited in claim 1, wherein said door is pivotally connected to said housing by a pin that extends from said door and is received by a slot in said beznet.

6. The electronic device as recited in claim 5, wherein said slot has a diameter that is larger than a diameter of said pin so that said door can move in a lateral direction when said door is moved into the closed position.

7. An electronic device, comprising:
   a housing that has a beznet protrusion which is shaped as a segment of a sphere that has a radius, said beznet protrusion also having a center, a forward surface and an opposite rearward surface; and,
   a door pivotally connected to said housing, said door having a pair of door protrusions that are each shaped as a segment of a sphere, wherein each sphere has a center, a forward surface and an opposite rearward surface that engage said rearward surface of said beznet protrusion to secure said door in a closed position, wherein said center of said beznet protrusion is spaced from said center of one of said door protrusions a distance approximately equal to said radius of said beznet protrusion when said door is in the closed position.

8. The electronic device as recited in claim 7, wherein said door protrusions are integral with a lip that extends from a door panel of said door.

9. The electronic device as recited in claim 7, wherein said beznet protrusion has a diameter that is greater than a predetermined distance which separates said door protrusions.

10. The electronic device as recited in claim 7, wherein said door has a rib that engages said housing when said door is in the closed position.

11. The electronic device as recited in claim 7, wherein said door is pivotally connected to said housing by a pin that extends from said door and is received by a slot in said beznet.

12. The electronic device as recited in claim 11, wherein said slot has a diameter that is larger than a diameter of said pin so that said door can move in a lateral direction when said door is moved into the closed position.

13. A television receiver, comprising:
    a housing that has a pair of beznet protrusions that are shaped as a segment of a sphere, wherein each sphere has a center, a forward surface and an opposite rearward surface; and,
    a door pivotally connected to said housing, said door having a door protrusion that is shaped as a segment of a sphere which has a radius, said door protrusion also having a center, a forward surface, and an opposite rearward surface that engages said rearward surfaces of said beznet protrusions to secure said door in a closed position, wherein said center of said door protrusion is spaced from said center of one of said beznet protrusions a distance approximately equal to said radius of said door protrusion when said door is in the closed position.

14. The television receiver as recited in claim 13, wherein said door protrusion is integral with a lip that extends from a door panel of said door.

15. The television receiver as recited in claim 13, wherein said door protrusion has a diameter that is greater than a predetermined distance which separates said beznet protrusions.

16. The television receiver as recited in claim 13, wherein said door has a rib that engages said housing when said door is in the closed position.

17. The television receiver as recited in claim 13, wherein said door is pivotally connected to said housing by a pin that extends from said door and is received by a slot in said beznet.

18. The television receiver as recited in claim 17, wherein said slot has a diameter that is larger than a diameter of said pin so that said door can move in a lateral direction when said door is moved into the closed position.

19. A television receiver, comprising:
    a housing that has a beznet protrusion which is shaped as a segment of a sphere that has a radius, said beznet protrusion also having a center, a forward surface and an opposite rearward surface; and,
    a door pivotally connected to said housing, said door having a pair of door protrusions that are each shaped as a segment of a sphere, wherein each sphere has a center, a forward surface and an opposite rearward surface that engage said rearward surface of said beznet protrusion to secure said door in a closed position, wherein said center of said beznet protrusion is spaced from said center of one of said door protrusions a distance approximately equal to said radius of said beznet protrusion when said door is in the closed position.

20. The television receiver as recited in claim 19, wherein said door protrusions are integral with a lip that extends from a door panel of said door.

21. The television receiver as recited in claim 19, wherein said beznet protrusion has a diameter that is greater than a predetermined distance which separates said door protrusions.

22. The television receiver as recited in claim 19, wherein said door has a rib that engages said housing when said door is in the closed position.

23. The television receiver as recited in claim 19, wherein said door is pivotally connected to said housing by a pin that extends from said door and is received by a slot in said beznet.

24. The television receiver as recited in claim 23, wherein said slot has a diameter that is larger than a diameter of said pin so that said door can move in a lateral direction when said door is moved into the closed position.

* * * * *